United States Patent
Palmer (10) Patent No.: US 12,481,586 B2
(45) Date of Patent: Nov. 25, 2025

(54) SEQUENTIAL GARBAGE COLLECTION

(71) Applicant: Micron Technology, Inc., Boise, ID (US)

(72) Inventor: David A. Palmer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/821,062

(22) Filed: Aug. 30, 2024

(65) Prior Publication Data

US 2024/0419588 A1    Dec. 19, 2024

Related U.S. Application Data (63) Continuation of application No. 17/899,137, filed on Aug. 30, 2022, now Pat. No. 12,079,122.

(51) Int. Cl.
*G06F 12/02*    (2006.01)

(52) U.S. Cl.
CPC ...... *G06F 12/0253* (2013.01); *G06F 12/0238* (2013.01); *G06F 2212/202* (2013.01)

(58) Field of Classification Search
CPC .......... G06F 12/0253; G06F 12/0238; G06F 2212/202; G06F 12/0246; G06F 2212/7205
See application file for complete search history.

(56) References Cited

U.S. PATENT DOCUMENTS

| | | | |
|---|---|---|---|
| 7,783,683 B2 | 8/2010 | Sekiguchi | |
| 11,630,764 B2* | 4/2023 | Jang | G06F 12/0246 |
| | | | 711/154 |
| 2008/0235489 A1 | 9/2008 | Gorobets | |
| 2010/0169588 A1 | 7/2010 | Sinclair | |
| 2012/0005406 A1 | 1/2012 | Hutchison et al. | |
| 2017/0083436 A1* | 3/2017 | Jung | G06F 12/0246 |
| 2017/0286288 A1* | 10/2017 | Higgins | G06F 12/0246 |
| 2019/0347197 A1* | 11/2019 | Lee | G06F 12/0246 |
| 2020/0387447 A1* | 12/2020 | Byun | G06N 5/04 |
| 2022/0035735 A1* | 2/2022 | Bhardwaj | G06F 12/0246 |
| 2022/0244886 A1* | 8/2022 | Yang | G06F 3/0659 |
| 2023/0063167 A1* | 3/2023 | Konan | G06F 9/4403 |
| 2024/0037067 A1* | 2/2024 | Nyamagouda | G06F 16/13 |
| 2024/0078174 A1* | 3/2024 | Ishihara | G06F 3/0631 |

* cited by examiner

*Primary Examiner* — Sean D Rossiter
(74) *Attorney, Agent, or Firm* — Brooks, Cameron & Huebsch, PLLC (57) ABSTRACT

An example apparatus for sequential garbage collection can include a memory device including a plurality of memory blocks associated with a plurality of logical block addresses (LBAs). The example apparatus can include a controller coupled to the memory device. The controller can be configured to monitor a quantity of read operations and a quantity of write operations associated with a plurality of command sizes performed on a portion of the plurality of memory blocks. The controller can be configured to monitor a quantity of read operations and a quantity of write operations associated with a particular LBA. The controller can be configured to determine a type of garbage collection operation to perform based on the monitoring.

20 Claims, 8 Drawing Sheets

SEQUENTIAL GARBAGE COLLECTION

PRIORITY INFORMATION

This application is a Continuation of U.S. application Ser. No. 17/899,137, filed Aug. 30, 2022, the contents of which are included herein by reference.

TECHNICAL FIELD

The present disclosure relates generally to semiconductor memory and methods, and more particularly, to sequential garbage collection

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can retain stored data when not powered and can include NAND flash memory, NOR flash memory, phase change random access memory (PCRAM), resistive random access memory (RRAM), and magnetic random access memory (MRAM), among others.

Memory devices can be combined together to form a solid state drive (SSD). An SSD can include non-volatile memory (e.g., NAND flash memory and/or NOR flash memory), and/or can include volatile memory (e.g., DRAM and/or SRAM), among various other types of non-volatile and volatile memory. Flash memory devices can include memory cells storing data in a charge storage structure such as a floating gate, for instance, and may be utilized as non-volatile memory for a wide range of electronic applications. Flash memory devices typically use a one-transistor memory cell that allows for high memory densities, high reliability, and low power consumption.

An SSD can be used to replace hard disk drives as the main storage volume for a computer, as the solid state drive can have advantages over hard drives in terms of performance, size, weight, ruggedness, operating temperature range, and power consumption. For example, SSDs can have superior performance when compared to magnetic disk drives due to their lack of moving parts, which may avoid seek time, latency, and other electro-mechanical delays associated with magnetic disk drives.

Some memory cells (e.g., Flash cells, phase change cells, etc.) are capable of being operated (e.g., programmed, read, erased, etc.) in both a single level cell (SLC) mode and an extra level cell (XLC) mode (e.g., 2-bit mode, 3-bit mode, 4-bit mode, etc.). Such cells can be referred to as "mixed mode" memory cells. An SLC memory cell can refer to a cell programmed to a targeted one of two different data states and configured to store a single data unit (e.g., one bit). XLC memory cells can refer to cells programmed to a targeted one of more than two different data states such that they are configured to store more than a single data unit (e.g., 2 bits, 2.5 bits, 3 bits, 4 bits, etc.). XLC cells may be referred to as multi state memory cells, multiunit cells, or multilevel cells. XLCs can provide higher density memories without increasing the number of memory cells since each cell can represent more than one data unit. In various instances, SSDs may be configured to write host data in SLC mode. However, as the available memory space fills up, data written in SLC mode can be rewritten in XLC mode to free up space.

DETAILED DESCRIPTION

An example apparatus for sequential garbage collection can include a memory device including a plurality of memory blocks associated with a plurality of logical block addresses (LBAs). The example apparatus can include a controller coupled to the memory device. The controller can be configured to monitor a quantity of read operations and a quantity of write operations associated with a plurality of command sizes performed on a portion of the plurality of memory blocks. The controller can be configured to monitor a quantity of read operations and a quantity of write operations associated with a particular LBA. The controller can be configured to determine a type of garbage collection operation to perform based on the monitoring. A first type of garbage collection operation can include a sequential garbage collection operation. A second type of garbage collection operation can include a non-sequential garbage collection operation.

Garbage collection refers to the process of collecting all valid data from a source memory block, writing the valid data to a destination memory block, and erasing the source block (along with all invalid data) to generate a free block. Garbage collection of data stored in memory in accordance with the present disclosure can increase the performance (e.g., increase the speed, increase the reliability, etc.) and/or increase the endurance (e.g., increase the lifetime) of the memory, among other benefits. For example, garbage collection schemes in accordance with the present disclosure can increase the performance of the memory early in (e.g., at the beginning of) the lifetime of the memory, when large files, such as operating system (OS) files, game files, video files, and/or other program installations are likely to be performed on the memory.

Garbage collection can increase write amplification associated with memory, which can reduce lifetime of an SSD, for example. Write amplification can refer to a phenomenon in which a quantity of physical data written is a multiple of a logical quantity intended to be written. Write amplification can occur due to the fact that flash memory must be erased before being rewritten, often with coarser granularity of the erase operation when compared to the write operation. In various instances, larger portions of flash memory may be erased and rewritten than actually required by the amount of new data being written. This multiplying effect can increase a number of writes over the life of an SSD which can shorten a lifespan of the SSD.

When an SSD is writing large amounts of data, the data can be from different portions of the memory device and therefore may not be logically sequential. For example, a series of logical block addresses can include LBA-0, LBA-1, LBA-2, LBA-3, etc., in a logically sequential order. In the instance where LBA-0 and LBA-3 are designated for garbage collection, LBA-0 to LBA-3 could sequentially be garbage collected together or LBA-0 and LBA-3 could be non-sequentially garbage collected. As an example, if LBA-0 and LBA-3 are valid data in a source block, a sequential garbage collection operation can also read valid LBA-1 and LBA-2 data from additional source blocks and write LBA-0, LBA-1, LBA-2, LBA-3 as a 16 kilobyte (KB) portion of LBA sequential data to a destination block, instead of writing LBA-0, LBA-3 to the destination block (which would be a non-sequential garbage collection).

Performing a non-sequential garbage collection can have the benefit of not performing unnecessary read operations or write operations when not needed (e.g., such as not reading or writing LBA-1 and LBA-2 since a garbage collection is not needed for these two LBAs, in this example). However, subsequent operations may require more operations when the data is not written logically sequential and may cost more performance in the long run. Likewise, performing a sequential garbage collection can have upfront performance costs and may not be necessary. In order to determine which approach to take, a determination can be made based on criteria and/or thresholds in order to maximize performance and long-term efficiency of the memory device, as will be described herein.

In an example of a source block with LBA-0 and LBA-3, as described above, a host can send a read command that indicates to start at LBA=0 and read for a length of 4 (e.g., read LBA-0 through LBA-3). In the instance where data was not sequentially garbage collected, the memory device can read LBA-0 and LBA-3 from a destination block as well as LBA-1 and LBA-2 from a different block (since the LBAs were not stored sequentially) and combine the data in internal memory and transfer the full amount (e.g., 16 KB) of sequential data to the host. This operation could use 2-3 non-volatile memory read operations. In the instance where the data is sequential, the command may be fulfilled with a single NAND read to get LBA-0 to LBA-3. This host command can experience less latency (e.g., one vs. three read commands, which can be particularly expensive resource-wise if each of the blocks read is in the same die or plane) and consumes correspondingly less energy. Because sequential garbage collection reads and writes at least as much data as non-sequential garbage collection, a write amplification of the sequential garbage collection is greater than or equal to the write amplification of non-sequential garbage collection. Likewise, the energy consumption of sequential garbage collection is greater than or equal to the energy consumption of non-sequential garbage collection.

In some previous approaches, a sequential garbage collection operation may be performed in all instances where a garbage collection is used and can use unnecessary resources of the memory device. In some previous approaches, a non-sequential garbage collection operation can be performed and data can be stored logically non-sequential, resulting in additional memory resources in subsequent operations. In such approaches, memory resources can be over used when a different approach or multi-tiered approach may provide better results. In a number of examples described below, a sequential garbage collection determination can be used to prioritize which type of garbage collection operation is most efficient for the memory device based on criteria and/or a threshold of ratios of read operations and/or write operations, among other criteria.

As used herein, "a number of" something can refer to one or more such things. For example, a number of memory cells can refer to one or more memory cells. Additionally, the designators "N", "B", "R", and "S", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 208 may reference element "08" in FIG. 2, and a similar element may be referenced as 308 in FIG. 3.

Figure 1:
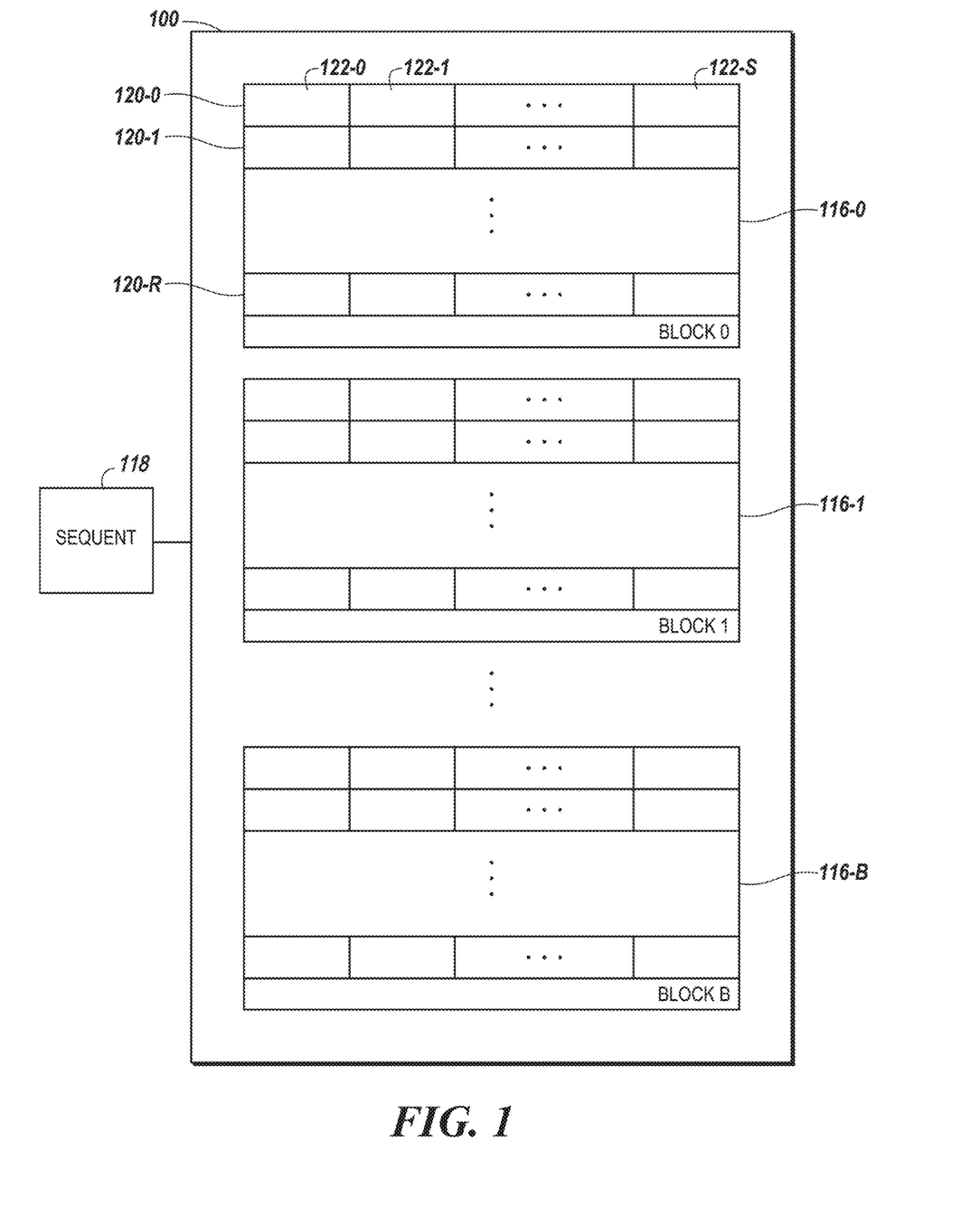
FIG. 1 illustrates a diagram of a portion of a memory array having a number of physical blocks in accordance with a number of embodiments of the present disclosure.

FIG. 1 illustrates a diagram of a portion of a memory array 100 having a number of physical blocks and a sequential component ("SEQUENT") 118 in accordance with a number of embodiments of the present disclosure. Memory array 100 can be, for example, a NAND flash memory array. However, embodiments of the present disclosure are not limited to a particular type of memory or memory array. For example, memory array 100 can be a DRAM array, an RRAM array, or a PCRAM array, among other types of memory arrays. Further, although not shown in FIG. 1, memory array 100 can be located on a particular semiconductor die along with various peripheral circuitry associated with the operation thereof.

As shown in FIG. 1, memory array 100 has a number of physical blocks 116-0 (BLOCK 0), 116-1 (BLOCK 1), . . . , 116-B (BLOCK B) of memory cells. The memory cells can be mixed mode cells operable as SLCs and/or XLCs. The number of physical blocks in memory array 100 may be 128 blocks, 512 blocks, or 1,024 blocks, but embodiments are not limited to a particular multiple of 128 or to any particular number of physical blocks in memory array 100. A first number of blocks 116-0, 116-1, . . . , 116-B can be allocated as a first portion of memory blocks, a second number of blocks 116-0, 116-1, . . . , 116-B can be allocated as a second portion of memory blocks, and/or a third number of blocks 116-0, 116-1, . . . , 116-B can be allocated as a third portion of memory blocks. Different portions of memory can serve as a dynamic SLC cache for garbage collection purposes. For example, different portions of memory can be dynamically increased and/or decreased in size as demands on the memory are increased and/or decreased and garbage collection reducing these demands.

A number of physical blocks of memory cells (e.g., blocks 116-0, 116-1, . . . , 116-B) can be included in a plane of memory cells, and a number of planes of memory cells can be included on a die. For instance, in the example shown in FIG. 1, each physical block 116-0, 116-1, . . . , 116-B can be part of a single die. That is, the portion of memory array 100 illustrated in FIG. 1 can be die of memory cells.

As shown in FIG. 1, each physical block 116-0, 116-1, . . . , 116-B contains a number of physical rows (e.g., 120-0, 120-1, . . . , 120-R) of memory cells coupled to access lines (e.g., word lines). The number of rows (e.g., word lines) in each physical block can be 32, but embodiments are not limited to a particular number of rows 120-0, 120-1, . . . , 120-R per physical block. Further, although not shown in FIG. 1, the memory cells can be coupled to sense lines (e.g., data lines and/or digit lines).

Each row 120-0, 120-1, . . . , 120-R can include a number of pages of memory cells (e.g., physical pages). A physical page refers to a unit of programming and/or sensing (e.g., a number of memory cells that are programmed and/or sensed together as a functional group). In the embodiment shown in FIG. 1, each row 120-0, 120-1, . . . , 120-R comprises one physical page of memory cells. However, embodiments of the present disclosure are not so limited. For instance, in a number of embodiments, each row can comprise multiple physical pages of memory cells (e.g., one or more even pages of memory cells coupled to even-numbered bit lines, and one or more odd pages of memory cells coupled to odd numbered bit lines). Additionally, for embodiments including XLCs, a physical page of memory cells can store multiple pages (e.g., logical pages) of data, for example, an upper page of data and a lower page of data, with each cell in a physical page storing one or more bits towards an upper page of data and one or more bits towards a lower page of data.

In a number of embodiments of the present disclosure, and as shown in FIG. 1, a page of memory cells can comprise a number of physical sectors 122-0, 122-1, . . . , 122-S (e.g., subsets of memory cells). Each physical sector 122-0, 122-1, . . . , 122-S of cells can store a number of logical sectors of data (e.g., data words). Additionally, each logical sector of data can correspond to a portion of a particular page of data. As an example, a first logical sector of data stored in a particular physical sector can correspond to a logical sector corresponding to a first page of data, and a second logical sector of data stored in the particular physical sector can correspond to a second page of data. Each physical sector 122-0, 122-1, . . . , 122-S, can store system and/or user data, and/or can include overhead data, such as error correction code (ECC) data, logical block address (LBA) data, and recurring error data.

Logical block addressing is a scheme that can be used by a host for identifying a logical sector of data. For example, each logical sector can correspond to a unique logical block address (LBA). Additionally, an LBA may also correspond to a physical address. A logical sector of data can be a number of bytes of data (e.g., 256 bytes, 512 bytes, or 1,024 bytes). However, embodiments are not limited to these examples.

It is noted that other configurations for the physical blocks 116-0, 116-1, . . . , 116-B, rows 120-0, 120-1, . . . , 120-R, sectors 122-0, 122-1, . . . , 122-S, and pages are possible. For example, rows 120-0, 120-1, . . . , 120-R of physical blocks 116-0, 116-1, . . . , 116-B can each store data corresponding to a single logical sector which can include, for example, more or less than 512 bytes of data.

The sequential component 118 can be coupled to the array 100 and can be used to monitor read operations, write operations, etc., and also to determine which type of garbage collection operation to perform based on monitored data. The sequential component 118 can be hardware, firmware, circuitry, and/or logic used to monitor a quantity of read operations, write operations, etc. in order to determine the type of garbage collection operation.

Figure 2:
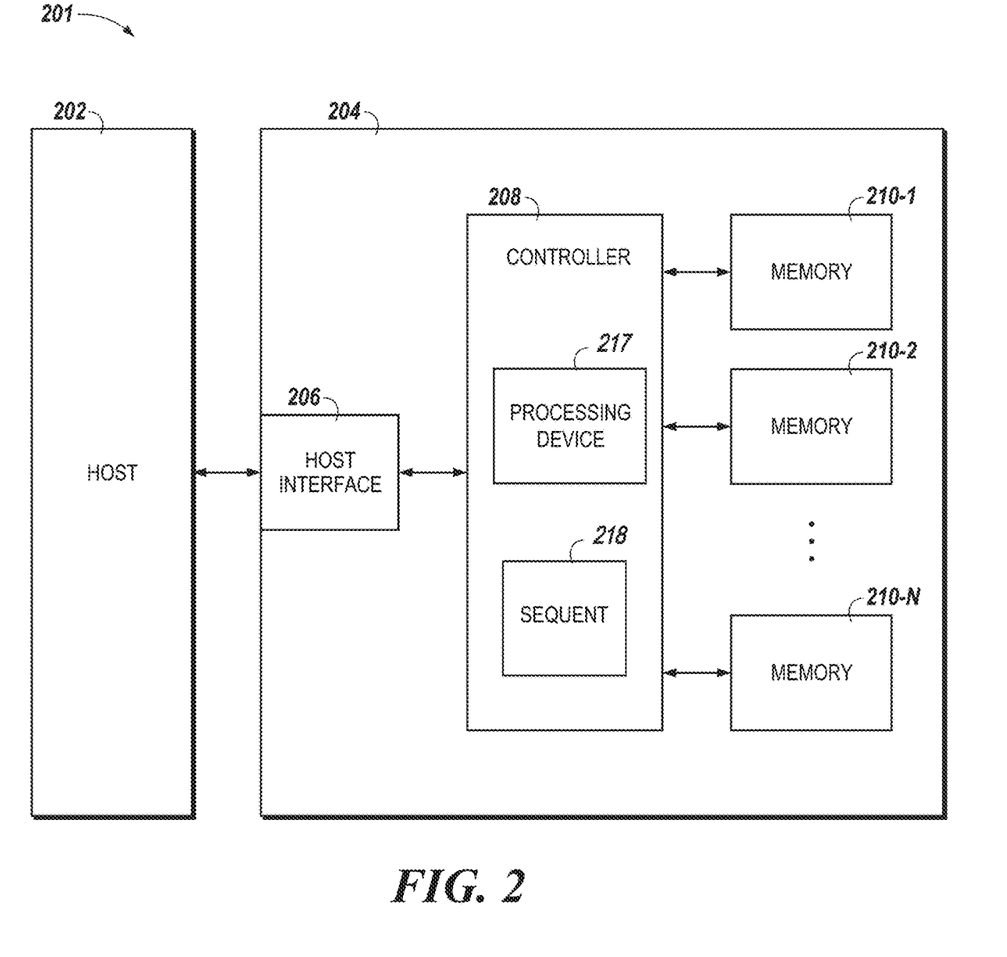
FIG. 2 is a block diagram of an apparatus in the form of a computing system comprising a memory system in accordance with a number of embodiments of the present disclosure.

FIG. 2 is a block diagram of an apparatus in the form of a computing system 201 comprising a memory system 204 in accordance with a number of embodiments of the present disclosure. As used herein, a memory system, controller, and/or memory device may separately be an "apparatus".

Memory system 204 can be, for example, a solid state drive (SSD). In the embodiment illustrated in FIG. 2, memory system 204 includes a host interface 206, a memory (e.g., a number of memory devices 210-1, 210-2, . . . , 210-N), and a controller 208 (e.g., an SSD controller) coupled to physical host interface 206 and memory devices 210-1, 210-2, . . . , 210-N.

Memory devices 210-1, 210-2, . . . , 210-N can include, for example, a number of non-volatile memory arrays (e.g., arrays of non-volatile memory cells). For instance, memory devices 210-1, 210-2, . . . , 210-N can include a number of memory arrays analogous to memory array 100 previously described in connection with FIG. 1.

In some embodiments, the memory devices 210-1, . . . , 210-N can include a number of arrays of memory cells (e.g., non-volatile memory cells). The arrays can be flash arrays with a NAND architecture, for example. However, embodiments are not limited to a particular type of memory array or array architecture. As described above in connection with FIG. 1, the memory cells can be grouped, for instance, into a number of blocks including a number of physical pages of memory cells. In a number of embodiments, a block refers to a group of memory cells that are erased together as a unit. A number of blocks can be included in a plane of memory cells and an array can include a number of planes. As one example, a memory device may be configured to store 8 KB (kilobytes) of user data per page, 128 pages of user data per block, 2048 blocks per plane, and 16 planes per device.

In operation, data can be written to and/or read from a memory device of a memory system (e.g., memory devices 210-1, . . . , 210-N of memory system 204) as a page of data, for example. As such, a page of data can be referred to as a data transfer size of the memory system. Data can be transferred to/from a host 202) in data segments referred to as sectors (e.g., host sectors). As such, a sector of data can be referred to as a data transfer size of the host. In some embodiments, NAND blocks may be referred to as erase blocks, with blocks being a unit of erasure and pages being a measure of reads and/or writes.

Host interface 206 can be used to communicate information between memory system 204 and another device such as a host 202. Host 202 can include a memory access device (e.g., a processor). As used herein, "a processor" can intend a number of processors, such as a parallel processing system, a number of coprocessors, etc. Example hosts can include personal laptop computers, desktop computers, digital cameras, digital recording and playback devices, mobile (e.g., smart) phones, PDAs, memory card readers, interface hubs, and the like.

The host system 202 uses the memory system 204, for example, to perform a command. As used herein, the term "command" refers to an instruction from a memory system to perform a task or function. For example, the memory controller 208 of the memory system 204 can cause a processing device 217 to perform a task based on a given command. In some embodiment, a command can include a memory request. That is, a command can be a request to read and/or write data from and/or to the memory device 210-1, 210-2, 210-N. The host system 202 may, for example, write data to the memory system 204 and read data from the memory system 204 based on a command (e.g., memory request).

Host interface 206 can be in the form of a standardized physical interface. For example, when memory system 204 is used for information storage in computing system 201, host interface 206 can be a serial advanced technology attachment (SATA) physical interface, a peripheral component interconnect express (PCIe) physical interface, or a universal serial bus (USB) physical interface, among other physical connectors and/or interfaces. In general, however, host interface 206 can provide an interface for passing control, address, information (e.g., data), and other signals between memory system 204 and a host (e.g., host 202) having compatible receptors for host interface 206.

Controller 208 can include, for example, control circuitry and/or logic (e.g., hardware and firmware). Controller 208 can be included on the same physical device (e.g., the same die) as memories 210-1, 210-2, . . . , 210-N. For example, controller 208 can be an application specific integrated circuit (ASIC) coupled to a printed circuit board including physical host interface 206 and memories 210-1, 210-2, . . . , 210-N. Alternatively, controller 208 can be included on a separate physical device that is communicatively coupled to the physical device that includes memories 210-1, 210-2, . . . , 210-N. In a number of embodiments, components of controller 208 can be spread across multiple physical devices (e.g., some components on the same die as the memory, and some components on a different die, module, or board) as a distributed controller.

Controller 208 can communicate with memory devices 210-1, 210-2, . . . , 210-N to sense (e.g., read), program (e.g., write), and/or erase information, among other operations. Controller 208 can have circuitry that may be a number of integrated circuits and/or discrete components. In a number of embodiments, the circuitry in controller 208 may include control circuitry for controlling access across memory devices 210-1, 210-2, . . . , 210-N and/or circuitry for providing a translation layer (e.g., a flash translation layer) between host 202 and memory system 204. The controller 208 can include a sequential component ("SEQUENT") 218 (similar to sequential component 118 in FIG. 1).

Controller 208 can control operation of a dedicated region, such as a block addressing portion, of each respective memory device 210-1, 210-2, . . . , 210-N as (e.g., configure a portion of each respective memory devices 210-1, 210-2, . . . , 210-N to operate as) a static (e.g., dedicated) single level cell (SLC) cache and/or a dynamic SLC cache. For example, a portion of each respective memory device 210-1, 210-2, . . . , 210-N can be configured to operate as a static cache in SLC mode and/or a dynamic cache in SLC mode. This portion of each respective memory device 210-1, 210-2, . . . , 210-N can be, for example, a first plurality of blocks (e.g., physical blocks) of memory cells in each respective memory, as will be further described herein (e.g., in connection with FIG. 3), and may be referred to herein as a first portion of the memory. In addition, portions of each respective memory device 210-1, 210-2, . . . , 210-N can include a second plurality of blocks, a third plurality of blocks, etc.

Figure 3:
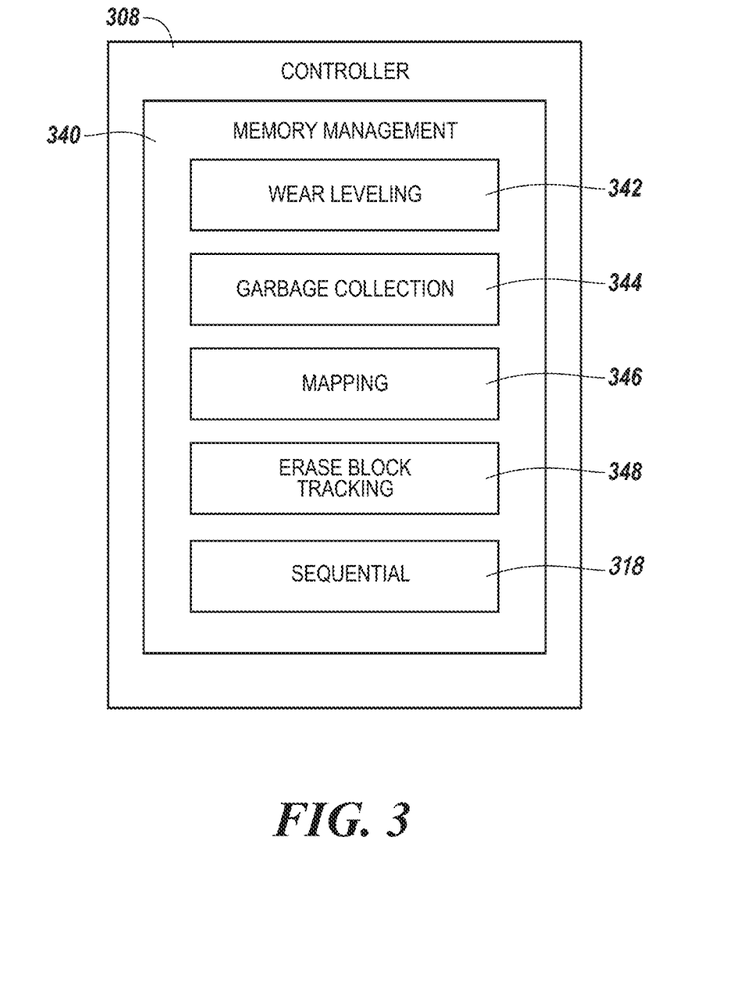
FIG. 3 illustrates a diagram of a controller in accordance with a number of embodiments of the present disclosure.

The second portion of each respective memory 210-1, 210-2, . . . , 210-N can be, for example, a second plurality of blocks (e.g., physical blocks) of memory cells in each respective memory, as will be further described herein (e.g., in connection with FIG. 3). Controller 208 can perform erase operations, as well as program and sense operations, on the cells of the second portion in SLC or XLC mode.

The size of the second portion of each respective memory 210-1, 210-2, . . . , 210-N can correspond to the quantity of memory cells used by that memory to program data stored in the SLCs of the memory to the XLCs of the memory (e.g., to fold the SLC data to the XLCs). Generally, the size of the first portion is small as compared to the whole drive density.

The embodiment illustrated in FIG. 2 can include additional circuitry, logic, and/or components not illustrated so as not to obscure embodiments of the present disclosure. For example, memory device 204 can include address circuitry to latch address signals provided over I/O connectors through I/O circuitry. Address signals can be received and decoded by a row decoders and column decoders, to access memories 210-1, 210-2, . . . , 210-N.

FIG. 3 illustrates a diagram of a controller 308 in accordance with a number of embodiments of the present disclosure. The controller may be analogous to controller 208 illustrated in FIG. 2, and may be coupled to a host interface and/or a plurality of memory devices, as illustrated in FIG. 2, herein. The controller 308 may include a memory management component 340, which may comprise a wear leveling 342 component, a garbage collection 344 component, a mapping 346 component and an erase block tracking 348 component.

In some embodiments, the wear leveling 342 component may be configured to implement wear leveling on one or more blocks associated with the memory device(s) (e.g., memory device(s) 210-1, . . . , 210-N illustrated in FIG. 2) to control the wear rate of such memory devices. Wear leveling may reduce the number of process cycles (e.g., program and/or erase cycles) performed on a particular groups of blocks by spreading such cycles more evenly over an entire memory array and/or memory device. Wear leveling can include static wear leveling and/or dynamic wear leveling to minimize the amount of valid blocks moved to reclaim a block. For example, static wear leveling may include writing static data to blocks that have high program/erase counts to prolong the life of the block. In some embodiments, wear leveling may include garbage collection operations, which may be implemented by garbage collection 344 component.

Garbage collection may include reclaiming (e.g., erasing and making available for programming) blocks that have the most invalid pages among blocks in the memory device(s). In some embodiments, garbage collection may include reclaiming blocks with more than a threshold amount (e.g., quantity) of invalid pages. However, if sufficient free blocks exist for a programming operation, then a garbage collection operation may not occur. Garbage collection may generally be performed in the background (e.g., during idle time of the memory); however, in some embodiments, garbage collection may be performed in foreground, for instance in response to a determination that an amount of free blocks has decreased below a threshold free block count.

In some embodiments, the memory management 340 component may include a mapping 346 component that may be configured to control mapping of memory blocks in the memory device(s). For example, the mapping 346 component may be configured to map bad blocks that discovered during wear leveling and/or garbage collection operations to blocks that may still accept valid data.

In some embodiments, the controller 308 may be configured to control wear leveling utilizing information that may be determined by the erase block tracking 348 component. For example, the erase block tracking 348 component may be configured to increment a counter associated with each block in response to the block being written and/or erased.

In some embodiments, the controller 308 can include a sequential component 318 (similar to sequential component 118 in FIGS. 1 and 218 in FIG. 2). The sequential component 318 can monitor, for each portion (or partition) of a memory device, a total number of read commands and write commands at particular command sizes that are used to access the partition. For example, command sizes can include a quantity of 4 kilobytes (KBs) reads, 4 KB writes, 16 KB reads, 16 KB writes, 128 KB reads, 128 KB writes, etc. In some examples, a limited number of counters or "buckets" can be used and round individual command sizes up or down based on granularity of the counts. These counters or "buckets" that are monitoring the quantity of reads and/or writes can be decayed over time or periodically reset to adapt to changes in host behavior or to fine-tune adjustments to the memory system.

The sequential component 318 (and/or 118 and/or 218) can maintain counts or quantities of the total logical block addresses (LBAs) read and written by the host for this particular partition in this example. A counter can be used to monitor these values. These values or counters can decay or be reset over time as well.

In some embodiments, a threshold ratio for a ratio of the quantity of read operations to write operations can be determined. The threshold ratio can be based on the relative energy cost of performing unnecessary read commands compared to the energy cost of performing additional write commands. As an example, write commands cost more energy than read commands, typically per bit. A read/write ratio threshold can be set to determine whether to perform a sequential garbage collection or to perform a non-sequential garbage collection based on whether the actual read/write ratio is above or below the threshold ratio. As an example, a read/write ratio above the threshold ratio can indicate to perform a sequential garbage collection operation. Vice versa, a read/write ratio below the threshold ratio can indicate to perform a non-sequential garbage collection operation.

In some embodiments, an LBA threshold ratio for a ratio of the total LBAs read to the total LBAs written by the host can be determined. An LBA ratio threshold can be set to determine whether to perform a sequential garbage collection or to perform a non-sequential garbage collection based on whether the actual read/write ratio is above or below the LBA threshold ratio. As an example, an LBA ratio above the LBA threshold ratio can indicate to perform a sequential garbage collection operation. Vice versa, an LBA threshold ratio below the threshold ratio can indicate to perform a non-sequential garbage collection operation.

Figure 4A:
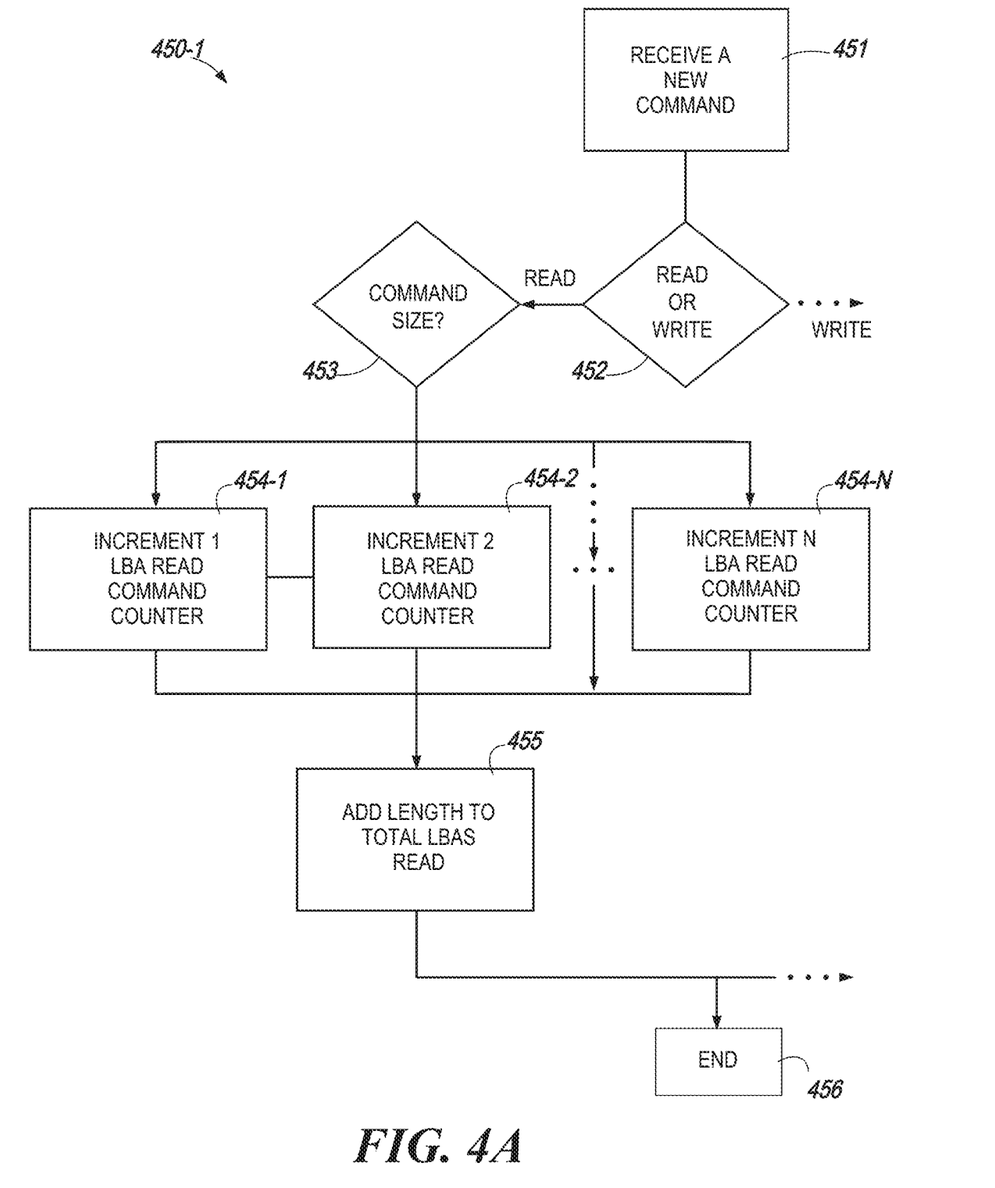
FIGS. 4A-4B illustrate a diagram of monitoring and collecting data in accordance with embodiments of the present disclosure.
Figure 4B:
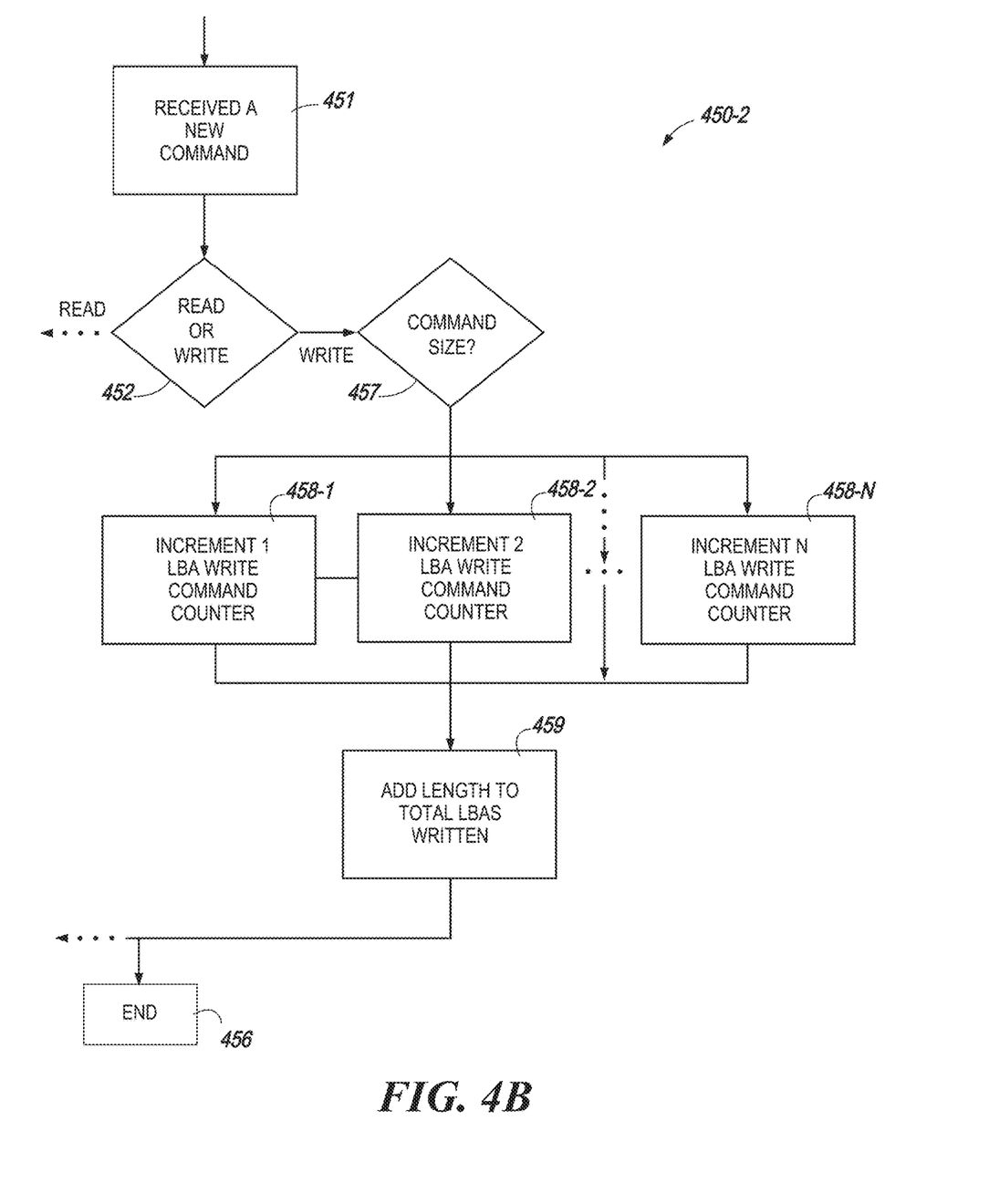

FIGS. 4A-4B illustrate diagrams 450-1, 450-2 of monitoring and collecting data in accordance with embodiments of the present disclosure. For ease of illustration, a larger diagram including 450-1, 450-2 have been separated to enlarge portions of the diagram for easier explanation and viewing. FIG. 4A is a flow diagram of an example read portion of the overall combined diagrams of 450-1, 450-2. Diagram 450-2 is an example write portion of the overall combined diagrams.

The example diagrams 450-1, 450-2 can be a method that can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by the sequential component 118 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 451, a controller (e.g., controller 208) can receive a new command. The new command can include a read operation command or a write operation command, a starting LBA, and a count of LBAs on which to perform the operation.

At block 452, a determination of whether the command is a read command or a write command can be performed. A read command can proceed to block 453. A write command can proceed to block 457 in FIG. 4B. At block 453, a command size associated with the command can be determined. For example, a command size can include a 4 KB read, a 16 KB read, etc. Based on the determination at block 453, a counter can be incremented based on the command size. For example, a command size of one LBA can increment "1 LBA" read command counter 454-1 by one value. A command size of 2 LBAs can increment a "2 LBA" read command counter 454-2 by one value. Further, a command size of N LBAs can increment a an "N LBA" read command counter 454-N by one value. In this way, a plurality of command sizes can be monitored and quantified in order to monitor and track the types and sizes of commands that are received. At block 455, based on the command size, a value can be added to the length of the total LBAs read. At block 456, the monitoring and/or tracking of the command sizes and quantities can "END."

Referring to FIG. 4B, at block 457, in response to receiving, at block 451, and determining, at 452, a write command, a determination of the command size can be performed. For example, a command size can include a 4 KB write, a 16 KB write, etc. Based on the determination at block 457, a counter can be incremented based on the command size. For example, a command size of one LBA can increment "1 LBA" write command counter 458-1 by one value. A command size of 2 LBAs can increment a "2 LBA" write command counter 458-2 by one value. Further, a command size of N LBAs can increment a an "N LBA" write command counter 458-N by one value. In this way, a plurality of command sizes can be monitored and quantified in order to monitor and track the types and sizes of commands that are received. At block 459, based on the command size, a value can be added to the length of the total LBAs written. At block 456, the monitoring and/or tracking of the command sizes and quantities can "END."

Figure 5:
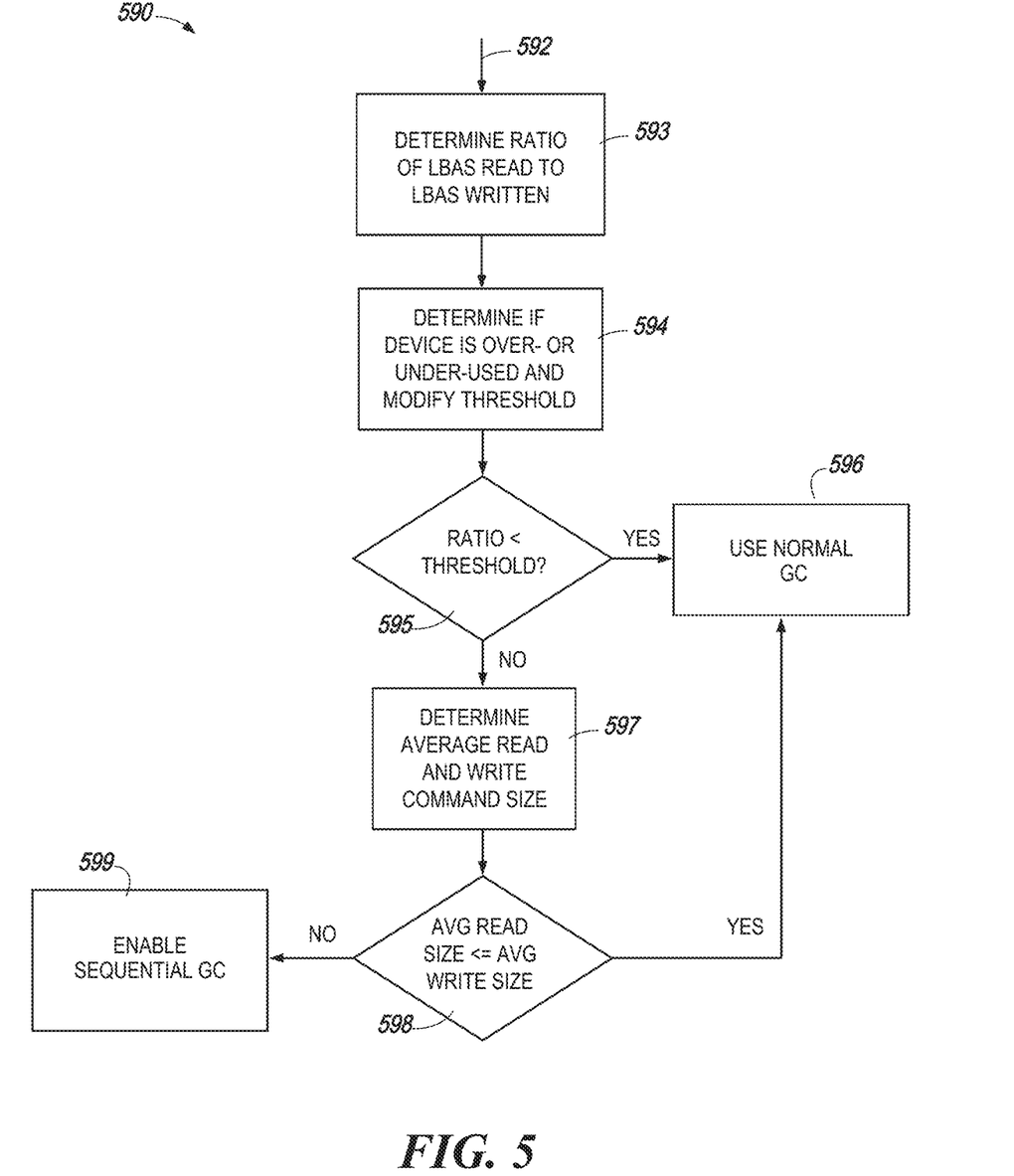
FIG. 5 illustrates an example flow diagram associated with sequential garbage collection in accordance with a number of embodiments of the present disclosure.

FIG. 5 illustrates an example flow diagram 590 associated with sequential garbage collection in accordance with a number of embodiments of the present disclosure. The example diagram 590 can be a method that can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by the sequential component 118 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 592, the process can begin. At block 593, a ratio of the LBAs read to the LBAs written can be determined.

At block 594, whether the memory device is over or under used can be determined and, based on the determination, a threshold can be modified. As an example, the determination of whether the memory device is over-used can be determined by comparing the total bytes written (TBW) to the total allowed bytes to be written or threshold TBW. The memory device can have an indication at manufacturing of a total quantity of bytes to be written before the memory device may be retired or considered no longer in working condition. As an example, the determination of whether the memory device is over-used can be determined by comparing an actual age of the memory device to an allowed threshold age. The allowed age can be based on data that indicates how long a memory device may operate correctly or efficiently and the actual age can be compared to the allowed threshold age to determine how close to an end of life that the memory device is.

A threshold for determining whether to garbage collect in a sequential fashion can be adjusted based on how overutilized or over-used. For example, sequentializing garbage collection increases the write amplification and therefore wears out a memory device faster than non-sequentializing garbage collection. Therefore, if the threshold is used to enable sequentializing garbage collection, the threshold can be raised to bias the memory device towards a normal (non-sequentialized) garbage collection if it is overutilized, and likewise lower the threshold to increase sequentializing garbage collection if it is underutilized. As an example, the closer the memory device is to an allowed age or an allowed total bytes written, the higher or lower the threshold can be adjusted based on whether resources are being preserved or fully utilized.

At block 595, a determination of whether the ratio of LBAs read to LBAs written is below a threshold can be performed. In response to the ratio being less than the threshold ratio, at block 596, a non-sequential garbage collection can be performed. In response to the ratio being greater than a threshold ratio, at block 597, a determination of the average read and average write command size can be performed. At block 598, a determination of whether the average read size is less than or equal to the average write size can be performed. In response to the average read size being less or equal to the average write size, at block 599 a sequential garbage collection can be performed. In response to the average read size being greater than the average write size, at block 596, a non-sequential garbage collection operation can be performed.

In some examples, a static approach can be used where blocks 593 and blocks 595 through 599 are employed. For example, command size counters and total LBA counts for a portion of data can be updated. When garbage collected is warranted, a ratio of the average read granularity to the average write granularity can be determined. A ratio of the total LBAs read to the total LBAs written can be determined. In response to the total LBAs read to total LBAs written exceeding a threshold, and in response to the average granularity of read commands exceeding the average granularity of write commands by at least 1 LBA size, a sequential garbage collection operation can be enabled. Otherwise, a non-sequential garbage collection can be enabled.

In some examples, a dynamic approach can be used where the phases of the static approach can be used in addition to comparing actual total bytes written (TBW) to a specified allowed TBW to obtain a percentage of wear. In addition, the dynamic approach can include comparing the actual age of the memory device (via a real time clock from the host) to an allowed total age to determine if the memory device is underutilized or overutilized. This data can be used to modify the threshold such that the sequential garbage collection is enabled more often if the device is underutilized and is enabled less often if the device is overutilized. In response to the memory device being underutilized/underworn, additional usage from garbage collection will likely not be significant. Therefore, using sequential garbage collection may provide a performance benefit for the host. In response to the memory device being overutilized or overworn, the alternative may apply, the memory device may not be able to afford the extra wear of sequentializing the garbage collection and therefore may require a higher threshold in order to be performed.

Figure 6:
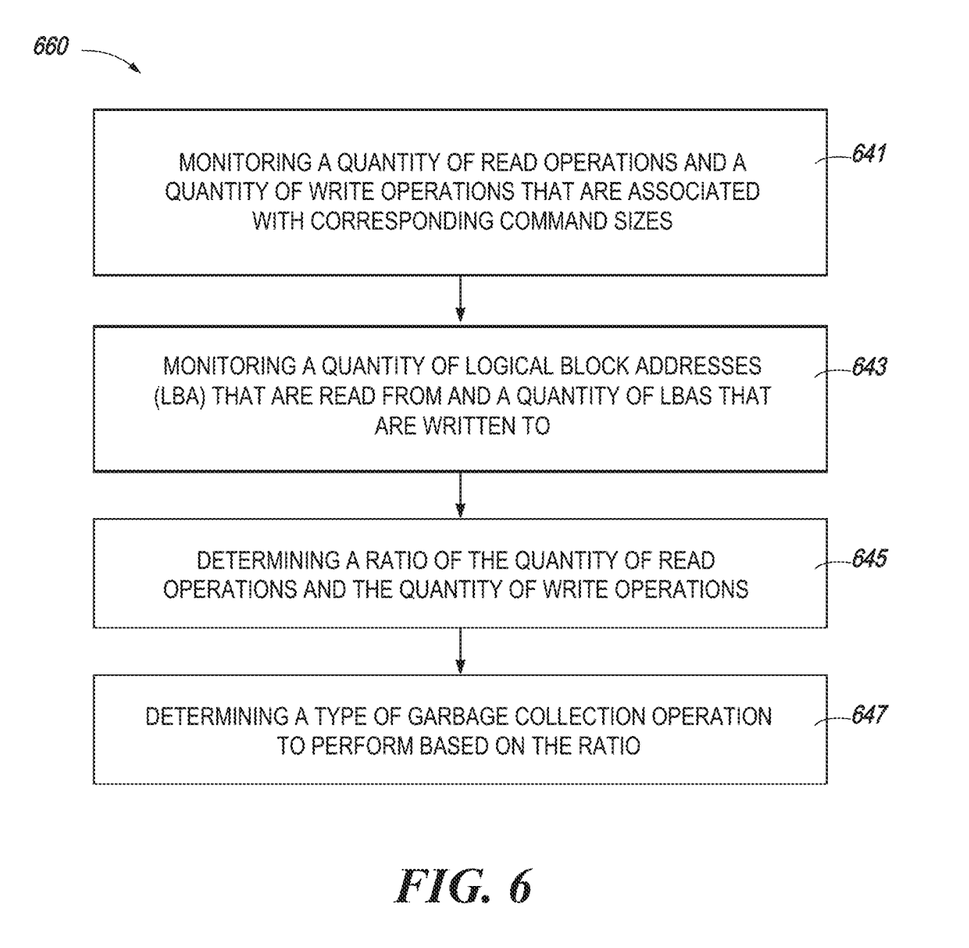
FIG. 6 is a flow diagram of an example method corresponding to sequential garbage collection in accordance with some embodiments of the present disclosure.

FIG. 6 is a flow diagram of an example method 660 corresponding to sequential garbage collection in accordance with some embodiments of the present disclosure. The method 660 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 440 is performed by the sequential component 118 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 641, the method 660 can include monitoring a quantity of read operations and a quantity of write operations that are associated with corresponding command sizes. The quantity of read operations and the quantity of write operations can be performed on a first portion of a plurality of memory blocks of a memory device.

At block 643, the method 660 can include monitoring a quantity of logical block addresses (LBA) that are read from and a quantity of LBAs that are written to. The quantity of LBAs can be read from a second portion of the plurality of memory blocks of the memory device and the quantity of LBAs can be written to the second portion. At block 645, the method 660 can include determining a ratio of the quantity of read operations and the quantity of write operations. At block 647, the method 660 can include determining a type of garbage collection operation to perform based on the ratio. In response to the ratio being above a threshold ratio, the type of garbage collection operation is a sequential garbage collection operation. In response to the ratio being below the threshold ratio, the type of garbage collection operation is a non-sequential garbage collection operation.

In some examples, the method 660 can further include determining an LBA ratio of the quantity of LBAs read from to the quantity of LBAs written to. In response to the LBA ratio being above a threshold LBA ratio, the type of garbage collection operation is a sequential garbage collection operation. In response to the LBA ratio being below a threshold LBA ratio, the type of garbage collection operation is a non-sequential garbage collection operation.

In some examples, the method 660 can include comparing an actual total bytes written (TBW) of the memory device to an allowed quantity of TBW of the memory device to determine a TBW ratio. The method 660 can further include comparing an actual age of the memory device to an allowed total age of the memory device to determine an age ratio. In response to the TBW ratio being above a threshold TBW ratio or the age ratio being above a threshold age ratio, performing a non-sequential garbage collection operation. In response to the TBW ratio being below a threshold TBW ratio or the age ratio being below a threshold age ratio, performing a sequential garbage collection operation.

Figure 7:
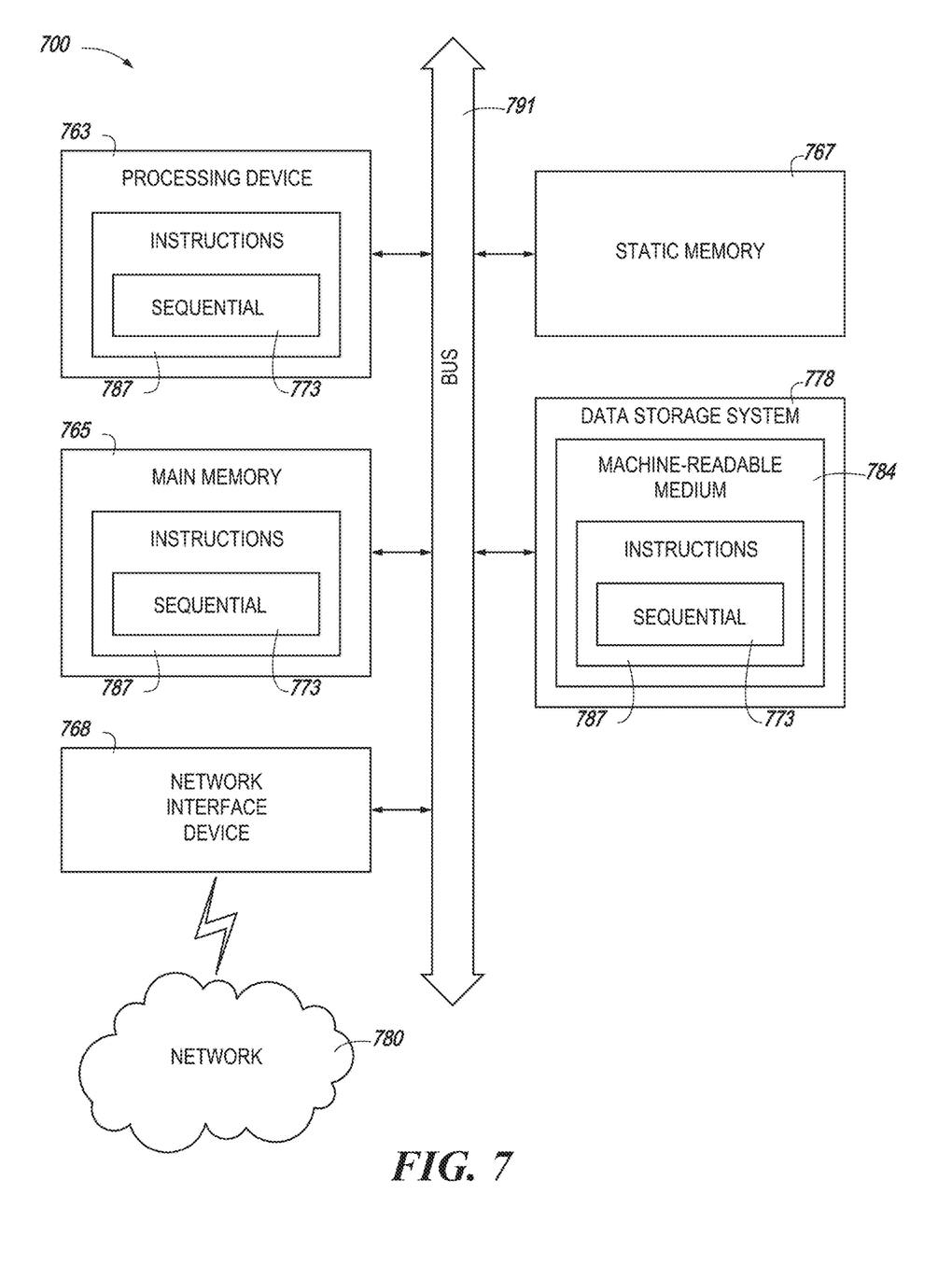
FIG. 7 is a block diagram of an example computer system in which embodiments of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 202 of FIG. 2) that includes, is coupled to, or utilizes a memory sub-system (e.g., the memory system 204 of FIG. 1) or can be used to perform the operations of a controller (e.g., to determine whether to perform a sequential garbage collection operation using a sequential component 218). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 763, a main memory 765 (e.g., read-only memory (ROM), flash memory, dynamic random access memory (DRAM) such as synchronous DRAM (SDRAM) or Rambus DRAM (RDRAM), etc.), a static memory 767 (e.g., flash memory, static random access memory (SRAM), etc.), and a data storage system 778, which communicate with each other via a bus 791.

Processing device 763 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 763 can also be one or more special-purpose processing devices such as an application specific integrated circuit (ASIC), a field programmable gate array (FPGA), a digital signal processor (DSP), network processor, or the like. The processing device 763 is configured to execute instructions 787 for performing the monitoring and sequential garbage collection operations using a sequential component 773 and steps discussed herein. The computer system 700 can further include a network interface device 768 to communicate over the network 780.

The data storage system 778 can include a machine-readable storage medium 784 (also known as a computer-readable medium) on which is stored one or more sets of instructions 787 or software embodying any one or more of the methodologies or functions described herein. The instructions 787 can also reside, completely or at least partially, within the main memory 765 and/or within the processing device 763 during execution thereof by the computer system 700, the main memory 765 and the processing device 763 also constituting machine-readable storage media. The machine-readable storage medium 784, data storage system 778, and/or main memory 765 can correspond to the memory sub-system 104 of FIG. 1.

In one embodiment, the instructions 787 include instructions to implement functionality corresponding to sequential garbage collection (e.g., using sequential component 218 of FIG. 2). While the machine-readable storage medium 784 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a memory device comprising a plurality of memory blocks associated with a plurality of logical block addresses (LBAs);
   a controller coupled to the memory device and configured to:
   monitor a quantity of read operations and a quantity of write operations performed on a portion of the plurality of memory blocks; and
   determine a type of garbage collection operation to perform based on a threshold ratio of the quantity of read operations to the quantity of write operations.

2. The apparatus of claim 1, wherein the controller is configured to perform a sequential garbage collection operation in response to a determined ratio of the quantity of read operations to the quantity of write operations being above the threshold ratio.

3. The apparatus of claim 1, wherein the controller is configured to perform a non-sequential garbage collection operation in response to a determined ratio of the quantity of read operations to the quantity of write operations being below the threshold ratio.

4. The apparatus of claim 1, wherein the controller is configured to monitor a quantity of logical block addresses (LBAs) that are read from a portion of the plurality of memory blocks of the memory device to determine a LBA read counter value.

5. The apparatus of claim 4, wherein the controller is configured to monitor a quantity of LBAs that are written to the portion of the plurality of memory blocks of the memory device to determine a LBA write counter value and determine an LBA ratio of the LBA read counter value to the LBA write counter value.

6. The apparatus of claim 1, wherein the controller is configured to clear a counter that maintains the quantity of read operations and the quantity of write operations at particular time intervals.

7. The apparatus of claim 1, wherein the controller is configured to compare an age of the memory device to an allowed age of the memory device to determine a memory device utilization value, wherein the controller is configured to perform the type of garbage collection operation based on the memory device utilization value.

8. The apparatus of claim 1, wherein the controller is configured to determine a ratio of a total quantity of bytes written to an allowed total bytes to be written and adjust the threshold ratio that triggers the type of garbage collection operation to perform.

9. A method, comprising:
   monitoring a quantity of read operations and a quantity of write operations that are performed on a first portion of a plurality of memory blocks of a memory device and associated with corresponding command sizes;
   monitoring a quantity of logical block addresses (LBAs) that are read from and a quantity of LBAs that are written to, wherein the quantity of LBAs are read from and the quantity of LBAs written to a second portion of the plurality of memory blocks of the memory device;
   determining a ratio of the quantity of read operations to the quantity of write operations; and
   determining a type of garbage collection operation to perform based on the ratio.

10. The method of claim 9 wherein, in response to the ratio being below a threshold ratio, the type of garbage collection operation is a non-sequential garbage collection operation.

11. The method of claim 9 further comprising determining an LBA ratio of the quantity of LBAs read from to the quantity of LBAs written to.

12. The method of claim 11 wherein, in response to the LBA ratio being above a threshold LBA ratio, the type of garbage collection operation is a sequential garbage collection operation.

13. The method of claim 11, wherein, in response to the LBA ratio being below a threshold LBA ratio, the type of garbage collection operation is a non-sequential garbage collection operation.

14. The method of claim 9, further comprising comparing an actual age of the memory device to an allowed total age of the memory device to determine an age ratio.

15. The method of claim 14, further comprising comparing an actual total bytes written (TBW) of the memory device to an allowed quantity of TBW of the memory device to determine a TBW ratio.

16. The method of claim 15, further comprising performing a non-sequential garbage collection operation in response to the TBW ratio being above a threshold TBW ratio or the age ratio being above a threshold age ratio and performing a sequential garbage collection operation in response to the TBW ratio being below the threshold TBW ratio or the age ratio being below a threshold age ratio.

17. An apparatus, comprising:
 a memory device comprising a plurality of memory blocks associated with a plurality of logical block addresses (LBAs); and
 a controller coupled to the memory device and configured to:
  monitor a quantity of logical block addresses (LBAs) that are read from a portion of the plurality of memory blocks of the memory device to determine a LBA read counter value;
  monitor a quantity of LBAs that are written to the portion of the plurality of memory blocks of the memory device to determine a LBA write counter value;
  determine an LBA ratio of the LBA read counter value to the LBA write counter value; and
  determine a type of garbage collection operation to perform based on the LBA ratio.

18. The apparatus of claim 17, wherein the controller is configured to compare an actual total bytes written (TBW) of the memory device to an allowed quantity of TBW of the memory device to determine a TBW ratio and compare an actual age of the memory device to an allowed total age of the memory device to determine an age ratio.

19. The apparatus of claim 17, wherein, in response to the LBA ratio being above a threshold LBA ratio the type of garbage collection operation is a sequential garbage collection operation.

20. The apparatus of claim 17, wherein, in response to the LBA ratio being below a threshold LBA ratio the type of garbage collection operation is a non-sequential garbage collection operation.

* * * * *